Patented Feb. 19, 1974

3,793,386
SEPARATION OF XYLENES BY ADSORPTION ON PARTIALLY DEHYDRATED COPPER ZEOLITES

Ronald I. Davis, Wilmington, Del., assignor to Sun Research and Development Co., Philadelphia, Pa.
No Drawing. Filed June 6, 1972, Ser. No. 263,370
Int. Cl. C07c 7/12; C10g 25/04
U.S. Cl. 260—674 SA    11 Claims

ABSTRACT OF THE DISCLOSURE

Selective adsorption of p-xylene from a fluid mixture containing m-xylene can be obtained with copper-exchanged molecular sieves (crystalline alumino-silicate zeolites) which have a water loss on ignition at 800° C. in the range of 8-20 wt. percent and preferably, have been partially dehydrated at a temperature in the range of 50-300° C. Preferably the Al/Si ratio in the zeolite framework is in the range of 0.2-0.65. For example, p-xylene can be separated from m-xylene by selective adsorption at 100° C. of the p-xylene on CuY zeolite which was partially dehydrated at 82° C. and contained about 15 wt. percent water by ignition analysis.

CROSS REFERENCE TO RELATED APPLICATIONS

This application is related to the applications of John A. Hedge Ser. No. 7,273, filed Jan. 30, 1970 (patented on June 6, 1972 as U.S. 3,668,267); Ser. No. 207,870, filed Dec. 14, 1971; Ser. No. 256,863, filed May 25, 1972; and Ser. No. 263,372, filed June 6, 1972.

Other relevant applications (which show zeolites which can be used as adsorbents in the present invention and methods for partial dehydration thereof) are Ser. No. 716,190, filed Mar. 26, 1968 and Ser. No. 211,040, filed Dec. 22, 1971, both of Kirsch, Barmby and Potts. All of the above-referred to applications are hereby incorporated herein.

BACKGROUND OF THE INVENTION

Molecular sieves have been used to separate distinct classes of organic compounds and have also been used to separate compounds within a given class. The separation of n-paraffins from branched paraffins with 5 A. molecular sieves is well known. Selective adsorption of aromatics from mixed streams with 10X and 13X sieves is also known. The use of 10X molecular sieves to separate mixtures of aromatics has been disclosed in U.S. Pat. Nos. 3,114,782 issued Dec. 17, 1963 to Fleck et al. and 3,133,126 issued May 12, 1964 to Fleck et al. U.S. Pats. 3,558,732 issued Jan. 26, 1971 and 3,626,020 issued Dec. 7, 1971 to Neuzil, and U.S. 3,665,046 issued May 23, 1972 to De Rosset, deal with the use of Type X and Y zeolites for separation of a C$_8$ aromatic isomer (e.g., p-xylene) from mixtures of such isomers.

None of the above cited patents disclose that the water content of the zeolite (which depends on the conditions of the dehydration or activation process) can be critical in determining selectivity of the adsorbent.

BRIEF DESCRIPTION OF THE INVENTION

Selective adsorption of one cyclic hydrocarbon from a fluid mixture with a structurally similar cyclic hydrocarbon can be obtained with molecular sieves (crystalline alumino-silicate zeolites) which contain copper, silver or nickel and which have been partially dehydrated at a temperature in the range of 50-300° C. and have a weight loss of water in the range of 8-20% on ignition analysis at 800° C. (or higher). The Al/Si ratio in the zeolite framework can be in the range of 0.1-1.0, more preferred 0.2-0.65.

The invention includes a process for separating p-xylene from m-xylene comprising contacting a fluid feed mixture containing said xylenes with a solid adsorbent comprising a partially dehydrated, substantially crystalline alumino-silicate zeolite having a weight loss in the range of 8-20% on ignition analysis at 800° C. and a critical pore diameter greater than abotut 6 A., the ratio Al/Si of the alumino-silicate framework of the zeolite being in the range of 0.2-1.0 (more preferred 0.2-0.65), whereby there is obtained an adsorbent containing an adsorbate which is richer in one said xylene than was said fluid feed mixture, and a raffinate product which contains less of the one said xylene than did said fluid feed mixture (and wherein at least 15% of the cation exchange capacity of said zeolite is satisfied by cations of copper; separating said raffinate product from said rich adsorbent and, removing the said adsorbate from said rich adsorbent.

The preferred adsorbent comprises a crystalline alumino-silicate zeolite having a critical pore diameter greater than about 6 A. preferably 6.5 to 15 A., and wherein the chemical formula of the zeolite can be expressed as

$$M_x(AlO_2)_x(SiO_2)_y \cdot (H_2O)_z$$

where $x$, $y$ and $z$ are integers, the ratio $x{:}y$ being from 0.2 to 1.0 and where M represents sufficient cations (including H$^+$) of metals, metal oxides or metal hydroxides to balance the electro-negativity associated with the alumino-silicate framework of the zeolite. Preferably $z$ is greater than $2x$, typically $3$–$6x$.

Separation of p-xylene from mixtures comprising C$_8$ aromatics, e.g., p-, m- and o-xylene and/or ethyl benzene can be achieved by using the present invention.

FURTHER DESCRIPTION

The preferred molecular sieves have a framework with an Al/Si atomic ratio in the range of 0.65-0.35, typically 0.5, such as Type Y zeolite, particularly at a water content of 10-18%.

Further preferred in this process is that the zeolite has been partially dehydrated by exposure to a temperature in the range of 50-300° C. (typically 70-125° C.) for sufficient time to produce the desired water content. Such exposure can be at a reduced pressure and/or in the presence of moisture (e.g., saturated air or steam).

Also preferred is that from 25-100% of the electro-negativity associated with the alumino-silicate framework of the zeolite is satisfied by cations of metals (especially copper and alkli metals, e.g., Na, K).

In general, in the present process selectivity can be improved by controlling the water content of the zeolite (as by the activation procedure, see the applications of Hedge and of Kirsch et al.) and/or by choice of the types and relative amounts of metal cations and protons which are in exchange positions on the zeolite. Among the preferred cations are those of copper, nickel and the alkali metals (e.g., Na$^+$, K$^+$) and the rare earths (e.g., Ce$^{+3}$, La$^{+3}$). Partially cation deficient (e.g., protonated) zeolites are also preferred (e.g., CuHY or CuHNaY, which can be prepared, for example, by procedures shown in Ser. No. 211,040. For example, Table IV herein shows a CuNH$_4$NaY zeolite. The ammonium cation can be decomposed, to produce CuHNaY zeolite, by heating the zeolite (as in the dehydration procedure). Such decompositions or "activations" are described in the Kirsch et al. applications.

After this decomposition, the water content of the zeolite can be adjusted, as by controlled exposure to moist air.

Ser. No. 207,870 contains a typical plot of catalyst activation (e.g., dehydration) temperature (° C.) versus time and shows that there are temperature "plateaus" in such activations. For example, the plot in Ser. No. 207,-

870 is for dehydration of a fully hydrated Type Y zeolite and shows that at atmospheric pressure there is one temperature plateau in the range of 100–150° C. (about 125° C.) and a second plateau in the range of 225–275° C. (about 250° C.). A preferred adsorbent for the present process is one which has been partially dehydrated at least one such plateau and below 300° C. The pressure in the dehydration can be below atmospheric (e.g., vacuum pump).

In general, the procedures described herein can be modified, by the man skilled in the refining art, to enable the separation of other cyclic hydrocarbons.

ILLUSTRATIVE EXAMPLES

Example 1

CuNaY zeolite, obtained by exhaustive exchange of NaY zeolite with 5% $CuSO_4$ in water, was activated by heating in an oven, in flowing air at 95° C. for 3 hours. The loss on ignition, LOI, at 800° C. was 11.4 wt. percent for the activated zeolite.

Four g. of activated zeolite were placed in a vertical column, heated to 100° C., and a hot solution containing equimolar proportions of para and meta xylenes was percolated through the column (gravity flow) until the raffinate had the same composition as the feed. The adsorbate was then stripped from the zeolite with refluxing toluene and the product analyzed by vapor phase chromatography. Paraxylene was preferentially adsorbed with a separation factor of 1.5 (as reported in Table I for Run 559).

Example 2

Example 1 was repeated with CuNaY zeolite activated at a variety of conditions. Table 1 reports the results of these runs.

Example 3

Example 1 was repeated with a variety of activation conditions and four different zeolites, K–Ba (a barium exchanged potassium Y zeolite); AgNaY (a silver exchanged sodium Y zeolite); NaY zeolite; and NiNaY (a nickel-exchanged sodium Y zeolite). Table II reports the results of these runs and similar runs with CuNaY zeolite.

Example 4

Example 1 was repeated with the K–Ba zeolite and the CuNaY zeolite at a variety of activation temperatures, at two different separation temperatures (25° C. and 100° C.) and with the feed in either liquid phase or in vapor phase in nitrogen gas as a carrier. The results are reported in Table III.

Typical analysis of preferred zeolites which can be used in the present process are reported in Table IV hereof.

TABLE I.—CuY ZEOLITE [1]

Separation of Liquid m-xylene and p-xylene and 100° C.

| Run No. | Activation conditions | Percent weight loss on ignition at 800° C. | Xylene capacity (gm./100 gm. sieve) | Separation factor for p-xylene |
|---|---|---|---|---|
| 553-1 | $N_2$ flow at 500° C | 0.9 | 14.7 | 0.7 |
| 459 | $N_2$ flow at 400° C | 1.0 | 15.5 | 0.7 |
| 554-1 | $N_2$ flow at 200° C | 2.5 | 14.8 | 0.7 |
| 557-2 | Air flow at 200° C | | | 0.8 |
| 554-2 | $N_2$ flow at 110° C | 10.1 | 13.7 | 0.9 |
| 557-1 | Air Flow at 110° C | 10.7 | 15.3 | 1.2 |
| 548 | Static air at 110° C | 10.4 | 10.7 | 1.4 |
| 554-3 | Static air at 110° C | 10.4 | 13.3 | 1.3 |
| 559 | Static air at 95° C | 11.4 | 10.7 | 1.5 |
| 561-2 | Static air at 82° C | 14.5 | 7.6 | 1.7 |
| 561-1 | Static air at 25° C | 23.6 | 9.2 | 1.1 |

[1] More precisely, CuNaY since the zeolite contained 1.5% $Na_2O$ and 13.2% CuO (fully hydrated basis).

TABLE II.—HYDRATED TYPE Y ZEOLITES

Separation of Liquid p-xylene and m-xylene at 100° C.

| Zeolite | Activation conditions | Percent wt. loss on ignition at 800° C. | Xylene capacity (gm./100 gm. sieve) | Separation factor ($\alpha p$) |
|---|---|---|---|---|
| K–Ba | $N_2$ flow at 400° C | | 13.6 | 3.8 |
| K–Ba | $N_2$ flow at 100° C | | 6.6 | 0.8 |
| CuNaY | $N_2$ flow at 400° C | 1.0 | 15.5 | 0.7 |
| CuNaY | Air flow at 110° C | 10.7 | 15.3 | 1.2 |
| CuNaY | Still air at 82° C | 14.5 | 7.6 | 1.7 |
| AgNaY | Air flow at 115° C | 3.7 | 14.4 | 1.3 |
| AgNaY | Still air at 80° C | 12.6 | 7.5 | 1.1 |
| NaY [1] | Air flow at 115° C | 13.4 | 13.5 | 1.2 |
| NaY | Still air at 81° C | 19.6 | 4.9 | 1.5 |
| NiNaY | Air flow at 115° C | 10.7 | 9.7 | 1.1 |
| NiNaY | Still air at 82° C | 16.3 | 6.1 | 1.2 |

[1] Typical analysis of NaY zeolite is 9.5% Na, 0.98 molar ratio $Na_2O/Al_2O_3$, 4.7 molar ratio $SiO_2/Al_2O_3$.

TABLE III

Mole Sieve Separation of m-xylene and p-xylene

| Sieve | Run No. | Activation temp. (° C.) | Separation temp. (° C.) | Xylene feed | Adsorbent capacity, g./100 g. sieve | Separation factor ($\alpha$) |
|---|---|---|---|---|---|---|
| K–Ba | 544 | 400 | 25 | Vapor in $N_2$ | 14.7 | $\alpha p=1.3$ |
| K–Ba | 545 | 400 | 100 | i-$C_8$ solution | 14.7 | $\alpha p=5.4$ |
| K–Ba | 543 | 110 | 25 | Vapor in $N_2$ | 5.3 | $\alpha m=1.4$ |
| K–Ba | 546 | 400 | 100 | Liquid | 13.6 | $\alpha p=3.80$ |
| CuNaY | 540 | 110 | 25 | Vapor in $N_2$ | 10.5 | $\alpha p=1.75$ |
| CuNaY | 548 | 110 | 100 | Liquid | 10.7 | $\alpha p=1.4$ |
| CuNaY | 549 | 400 | 100 | do | 15.5 | $\alpha m=1.4$ |
| K–Ba | 547 | 110 | 100 | do | 6.6 | $\alpha m=1.2$ |

[2] $\alpha p$=separation factor for p-xylene; $\alpha m$=separation factor for m-xylene.

TABLE IV.—TYPICAL ZEOLITE ANALYSES (Weight percentages)

| Zeolite | NiO | Percent CuO | Na₂O | Al₂O₃ | (NH₄)₂O | SiO₂ | LOI[1] | Total |
|---|---|---|---|---|---|---|---|---|
| NiNaNH₄Y | 5.31 | | 1.10 | 16.29 | 3.70 | 49.17 | 26.66 | 102.23 |
| CuNaNH₄Y | | 5.56 | 1.05 | [2]14.69 | 3.89 | 48.64 | 26.17 | 100 |
| NiNaY | 8.59 | | 2.09 | 15.39 | | 45.91 | 26.42 | 98.4 |
| CuNaY | | 13.16 | 1.50 | [2]16.12 | | 43.82 | 25.40 | 100 |

[1] Loss on ignition at 1,900° F.
[2] By difference.

The invention claimed is:

1. A process for separating p-xylene from m-xylene, said process comprising:
    (A) contacting a fluid feed mixture containing said xylenes with a solid adsorbent comprising a partially dehydrated, substantially crystalline alumino-silicate zeolite having a weight loss in the range of 8–20% on ignition analysis at 800° C. and a critical pore diameter greater than about 6A., the ratio Al/Si of the alumino-silicate framework of the zeolite being in the range of 0.2–1.0, wherein at least 15% of the cation exchange capacity of said zeolite is satisfied by cations of copper, and whereby there is obtained an adsorbent containing an adsorbate which is richer in one said xylene than was said fluid feed mixture, and a raffinate product which contains less of the one said xylene than did said fluid feed mixture;
    (B) separating said raffinate product from said rich adsorbent and;
    (C) removing the said adsorbate from said rich adsorbent.

2. Process according to claim 1 wherein said zeolite was partially dehydrated by exposure to a temperature in the range of 50–300° C. for sufficient time to produce said zeolite having a weight loss in the range of 8–20% upon ignition analysis at 800° C.

3. Process according to claim 1 wherein said temperature is in the range of 70–125° C. and said zeolite is a Type Y zeolite containing in the range of 10–18% water by ignition analysis at 800° C.

4. Process according to claim 1 wherein from 25–100% of the electronegativity associated with the alumino-silicate framework of said zeolite is satisfied by cations of metals.

5. Process according to claim 4 wherein said metals consists essentially of copper and alkali metals.

6. Process according to claim 5 wherein said metals consist essentially of copper and sodium.

7. Process according to claim 1 wherein said substantially crystalline alumino-silicate zeolite is at least 50% crystalline by X-ray, compared to a fully hydrated pure specimen of said zeolite, and wherein there is a loss of 9–18 weight percent water upon ignition analysis of said zeolite at 800° C.

8. Process according to claim 7 wherein said loss of water upon ignition analysis is in the range of 10–18 weight percent and wherein the said ratio Al/Si is in the range of 0.35–0.65.

9. Process according to claim 8 wherein p-xylene is separated from m-xylene by preferential adsorption of said p-xylene on a Type Y zeolite.

10. Process according to claim 9 wherein said zeolite has been partially dehydrated at a temperature in the range of 80–125° C.

11. Process according to claim 1 wherein said zeolite has been partially dehydrated at a temperature in the range of 80–230° C.

References Cited

UNITED STATES PATENTS

| 3,626,020 | 12/1971 | Neuzil | 260—674 |
| 3,649,176 | 3/1972 | Rosback | 208—310 |
| 3,649,177 | 3/1972 | Rosback | 208—310 |
| 3,668,266 | 6/1972 | Chen et al. | 260—674 |
| 3,663,638 | 5/1972 | Neuzil | 260—674 |
| 3,734,974 | 5/1973 | Neuzil | 260—674 |

DELBERT E. GANTZ, Primary Examiner

C. S. SPRESSER, Jr., Assistant Examiner

U.S. Cl. X.R.

208—310